(12) United States Patent
Lei et al.

(10) Patent No.: US 8,011,583 B2
(45) Date of Patent: Sep. 6, 2011

(54) SYSTEMS, DEVICES, AND/OR METHODS FOR MANAGING DATA MATRIX LIGHTING

(75) Inventors: Ming Lei, Acton, MA (US); Jason J Lee, Concord, MA (US); Richard G. Long, Hollis, NH (US)

(73) Assignee: Microscan Systems, Inc., Renton, WA (US)

( * ) Notice: Subject to any disclaimer, the term of this patent is extended or adjusted under 35 U.S.C. 154(b) by 653 days.

(21) Appl. No.: 12/147,585

(22) Filed: Jun. 27, 2008

(65) Prior Publication Data

US 2010/0282847 A1    Nov. 11, 2010

Related U.S. Application Data

(60) Provisional application No. 60/947,546, filed on Jul. 2, 2007.

(51) Int. Cl.
*G06K 7/00* (2006.01)

(52) U.S. Cl. .................................................. 235/438

(58) Field of Classification Search .............. 235/438, 235/462.09, 462.1, 468, 454, 494
See application file for complete search history.

(56) References Cited

U.S. PATENT DOCUMENTS

| 5,461,417 A | 10/1995 | White |
| 5,539,485 A | 7/1996 | White |
| 5,604,550 A | 2/1997 | White |
| 5,684,530 A | 11/1997 | White |
| 5,761,540 A | 6/1998 | White |
| 6,075,883 A | 6/2000 | Stern |
| 7,219,843 B2 * | 5/2007 | Havens et al. ........... 235/462.42 |
| 7,243,847 B2 | 7/2007 | Zhu |
| 7,336,197 B2 | 2/2008 | Ding |
| 2006/0022059 A1 | 2/2006 | Juds |
| 2006/0097054 A1 * | 5/2006 | Biss et al. ............... 235/462.45 |
| 2006/0232436 A1 | 10/2006 | Ding |
| 2008/0106794 A1 | 5/2008 | Messina |

FOREIGN PATENT DOCUMENTS

| EP | 0685140 | 12/1995 |
| GB | 2387433 | 10/2003 |
| WO | WO02075637 | 9/2002 |
| WO | WO2008039541 | 4/2008 |

OTHER PUBLICATIONS

PCT/US2008/008154, International Search Report and Written Opinion of the International Searching Authority, mail date Nov. 12, 2008.

* cited by examiner

*Primary Examiner* — Seung Lee
(74) *Attorney, Agent, or Firm* — Blakely Sokoloff Taylor & Zafman LLP

(57) ABSTRACT

Certain exemplary embodiments can provide a method, which can comprise causing a report to be automatically generated. The report can be indicative of a result of a read of a mark. The result can be automatically determined to pass a verification test. The verification test can be performed on an image obtained via an imaging system.

24 Claims, 18 Drawing Sheets

3000

MIL-STD-130N Options

Mark Type

○ Label Print
○ Direct Marking on Flat Surface
⊙ Direct Marking on Curved Surface Report ○ Highest Overall Grade
⊙ First Passing Overall Grade Restore Light Sequence Defaults Light Configuration

Select Light Order

| D | ↓ |
| 90 | ↑ ↓ |
| 30Q | ↑ ↓ |
| 30T - EW | ↑ ↓ |
| 30T - NS | ↑ ↓ |
| 45Q | ↑ |

| Light | Verification Grade |
|---|---|
| 90 | 4 (A) |
| 30 Q | 4 (A) |
| D | 4 (A) |
| 30T_EW | 4 (A) |
| 30T_NS | 4 (A) |
| 45 Q | 4 (A) |

| Light | Verification Grade |
|---|---|
| 90 | 4 (A) |
| 30 Q | 0 (F) |
| D | 4 (A) |
| 30T_EW | 0 (F) |
| 30T_NS | 0 (F) |
| 45 Q | 0 (F) |

18000

SYSTEMS, DEVICES, AND/OR METHODS FOR MANAGING DATA MATRIX LIGHTING

CROSS-REFERENCES TO RELATED APPLICATIONS

This application claims priority to, and incorporates by reference herein in its entirety, U.S. Provisional Patent Application Ser. No. 60/947,546, filed 2 Jul. 2007.

BACKGROUND

United States Patent Publication 20080106794 ("Messina"), which is incorporated by reference herein in its entirety, allegedly discloses, "[c]ertain exemplary embodiments can comprise a method, which can comprise illuminating a component via a beamsplitter. The beamsplitter can comprise at least three distinct light reflection zones. The beamsplitter can be adapted to illuminate a component with light energy reflected from each of a plurality of distinct light reflection zones." See Abstract.

U.S. Pat. No. 7,243,847 ("Zhu"), which is incorporated by reference herein in its entirety, allegedly discloses, "[a] digital imaging-based bar code symbol reading device comprises: an automatic object presence detection subsystem; an image formation and detection subsystem employing a CMOS area-type image sensing array; an LED-based illumination subsystem; an automatic light exposure measurement and illumination control subsystem; an image capturing and buffering subsystem; an image-processing bar code symbol reading subsystem; an input/output subsystem; and a system control subsystem for controlling the subsystems. The LED-based illumination subsystem is automatically driven by the automatic light exposure measurement and control subsystem responsive to the generation of control activation signals by the image sensing array and the automatic object presence detection subsystem during object illumination and image capture operations." See Abstract.

U.S. Pat. No. 6,075,883 ("Stern"), which is incorporated by reference herein in its entirety, allegedly discloses that "[a] system for simultaneously obtaining a plurality of images of an object or pattern from a plurality of different viewpoints is provided. Proper image contrast is obtained by replacing the light sources of earlier systems with equivalent light sensitive devices and replacing the cameras of earlier systems with equivalent light sources. Bright-field and dark-field images may be simultaneously obtained. In another aspect, a light source is positioned to illuminate at least some of an object. A plurality of light guides are positioned to simultaneously receive light reflected from the object and transmit it to a plurality of photodetectors. The light guides are arranged so their respective input ends are spaced substantially equally along at least a portion of a surface of an imaginary hemisphere surrounding the object. The signals from the photodetectors are processed and a plurality of images are formed. Another aspect provides generating composite images from simultaneously obtained images. Equivalent regions of each image geographically identical subpictures) are compared. The subpicture having the highest entropy is selected and stored. This process continues for all subpictures. A new composite picture is generated by combining the selected subpictures. In another aspect, the vector of relative light values gathered for each pixel or region of an object illuminated or scanned is used to determine reflectance properties of points or regions illuminated on the object or pattern. The reflectance properties may be stored in a matrix and the matrix used to read, for example, a Bar Code of a data matrix symbol." See Abstract.

SUMMARY

Certain exemplary embodiments can provide a method, which can comprise causing a report to be automatically generated. The report can be indicative of a result of a read of a mark. The result can be automatically determined to pass a verification test. The verification test can be performed on an image obtained via an imaging system.

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 3 is an exemplary embodiment of a user interface 3000;

FIG. 9 is an exemplary embodiment of a grading report 9000;

FIG. 12 is an exemplary embodiment of a grading report 12000;

DETAILED DESCRIPTION

Certain exemplary embodiments can provide a method, which can comprise causing a report to be automatically generated. The report can be indicative of a result of a read of a mark. The result can be automatically determined to pass a verification test. The verification test can be performed on an image obtained via an imaging system.

Figure 1:
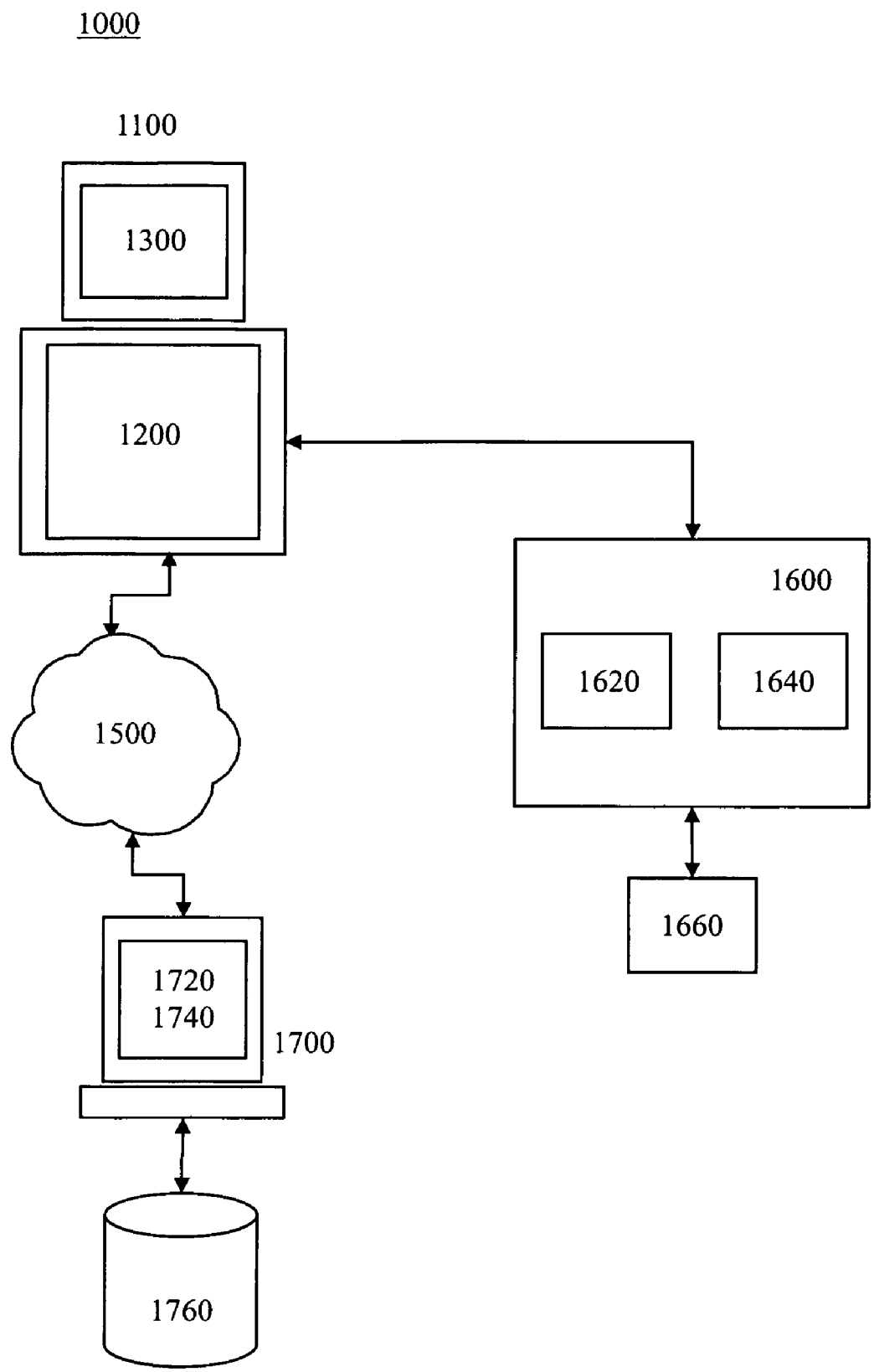
FIG. 1 is a block diagram of an exemplary embodiment of a system 1000.

FIG. 1 is a block diagram of an exemplary embodiment of a system 1000, which can comprise an information device 1100, an imaging sub-system 1600, a network 1500, and a server 1700. Information device 1100 can comprise a user interface 1300 and a Data Matrix mark processor 1200. User interface 1300 can be adapted to render images and/or information regarding images obtained from imaging sub-system 1600. Data Matrix mark processor 1200 can be adapted to obtain and/or analyze images obtained from imaging sub-system 1600. Data Matrix mark processor 1200 can be adapted to cause a control of a first light source 1620 and a second light source 1640. First light source 1620 and second light source 1640 can be illustrative of a plurality of light sources used to form a plurality of light configurations. Imaging subsystem 1600 can comprise any number of light sources, such as 2, 4, 6, 8, 12, 14, 18, 22, 28, 40, 64, 80, 91, 120, and/or any value or sub-range therebetween. First light source 1620 and second light source 1640 can comprise light emitting diodes.

Data Matrix mark processor 1200 can be adapted to read a Data Matrix mark. The read can be automatically determined to pass a verification test. The verification test can be performed on an image obtained via an automatically selected light configuration of a plurality of predetermined light configurations, the plurality of light configurations used to sequentially illuminate the Data Matrix mark in a user changeable predetermined order. The verification test can be adapted to determine that the read of the Data Matrix mark has resulted in a minimum passing grade of a user-selected industry standard.

Information device 1100 can be communicatively coupled to imaging sub-system 1600 and/or a camera 1660 of imaging sub-system 1600. Information device 1100 can be communicatively coupled, via a network 1500, to a server 1700. Server 1700 can comprise a server user interface 1720 and a server user program 1740. Server 1700 can comprise and/or be communicatively coupled to a memory device 1760. Functionally, server 1700 can be adapted to perform any function performed by information device 1100 and/or to process, store, manage, and/or control information regarding imaging sub-system 1600 and/or camera 1660.

A Data Matrix mark is a two-dimensional (2-D) bar code symbol that can be printed on labels and/or directly marked on items using dot-peen, laser/chemical etch, inkjet printing, and/or other methods. When permanently marked on items, Data Matrix marks can be called direct part marks (DPM). A possible specification for exemplary Data Matrix marks can be found in the MIL-STD-130 by the United States Department of Defense ("the DoD") as the 2-D machine readable code for unique item identification. To ensure that the Data Matrix mark can be read by Data Matrix readers through the intended life cycle of the marked item, the DoD has specified a minimum grade level of the mark in MIL-STD-130N based on a Data Matrix mark quality verification document Direct Part Mark (DPM) Quality Guideline, Association for Automatic Identification and Mobility ("AIM") DPM-1-2006.

To fully support MIL-STD-130 and AIM DPM-1-2006 for Data Matrix mark quality verification, a verification system can support lighting environments defined in AIM DPM-1-2006: Diffuse perpendicular on-axis/bright field (denoted as 90), Diffuse off-axis (denoted as D), Low-angle four direction (denoted as 30Q), Low-angle two direction (denoted as 30T), Low-angle one direction (denoted as 30S), Mid-angle four direction (denoted as 45Q). The system can enable and/or assist an operator to center the Data Matrix mark in a verification camera's field of view (FOV) with the correct orientation specified in AIM DPM-1-2006, regardless of the contrast of the Data Matrix mark, by displaying live video images with automatic exposure control enabled.

Certain exemplary embodiments can comprise providing a user interface to support DoD standard MIL-STD-130N for Data Matrix marking quality verification. The user interface can be adapted to provide one or more of the following functions:

- select lighting based on mark type;
- select lighting based upon a Best and/or a First Pass overall grade;
- reorder lighting to allow a First Pass to happen sooner without attempting other unsuitable lighting first;
- control individual light and display image sensor's system response parameters (exposure, gain, and offset) for one or more light sources;
- calibrate the sensor (e.g., via a button press) for one or more supported light configurations;
- display calibration data to a user;
- display live video with a graphics overlay to prompt the user to center the Data Matrix mark with a determined orientation (concentric squares);
- display live video with exposure control to display the Data Matrix mark to prompt the user to center the Data Matrix mark regardless of the contrast level of the Data Matrix mark;
- categorize a Data Matrix mark via a prediction a readability difficulty of the mark (e.g., easy types can be read using low cost Data Matrix readers with simple lighting while the more difficult types can be read with higher end Data Matrix readers with additional lighting options); and
- provide a placement target fixture that can be used for initial placement and positioning adjustment of an object comprising the mark. The Placement Target Fixture can perform one or more of the following functions;
    - provide a "map" of where the object containing the Data Matrix mark should be placed in order to be in a center of the camera's field of view;
    - provide a frame of reference for how to position the "map" under the camera with the object centered on the "map"; and
    - provide the target fixture in a size sufficient to move the fixture without having to touch the object (the object might be close to a bottom of the camera) in order to further center the Data Matrix mark using live video.

Figure 2:
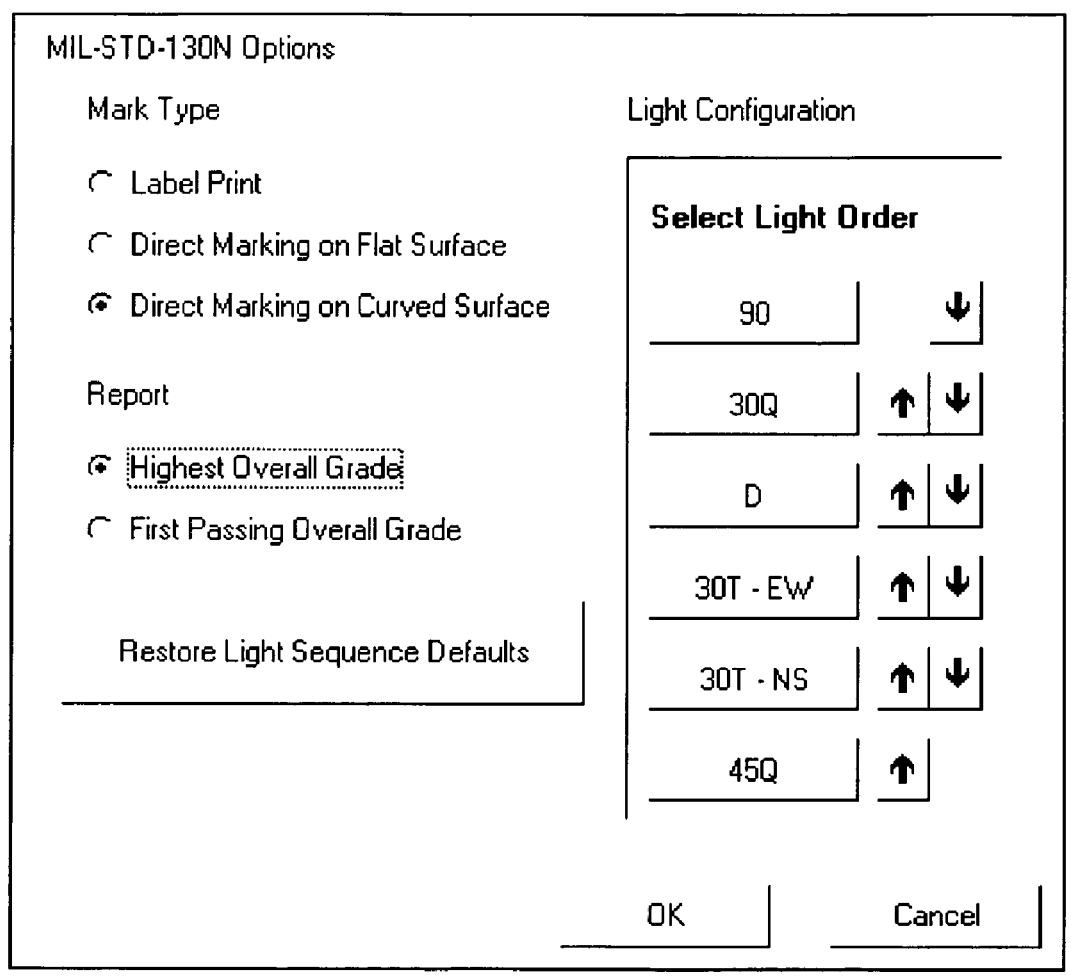
FIG. 2 is an exemplary embodiment of a user interface 2000.

FIG. 2 is an exemplary embodiment of a user interface 2000, which can provide options in accordance with MIL STD-130N. Lighting configurations adapted to illuminate a Data Matrix mark can be selected based upon a mark type. To support lighting environments specified in AIM DPM-1-2006, certain exemplary embodiments can individually control light configurations denoted as 90, D, 45Q, 30Q, 30T-EW (East/West), 30T-NS (North/South), and 30S-E (East), 30S-W (West), 30S-N (North), 30S-S (South). Based on the type of mark selected by the operator, the system can automatically configure one or more of a set of light configurations. For example, when the Mark Type is set to Direct Marking on Flat Surface, a list of light configurations can comprise 90, 45Q, 30Q, 30T-EW, 30T-NS, 30S-E, 30S-W, 30S-N, and 30S-S. When the Mark Type is set to Direct Marking on Curved Surface, the list of light configurations can change to 90, 30Q, D, 30T-EW, 30T-NS, and 45Q.

An order of illumination by a set of lighting configurations can be based upon a best and/or first passing overall grade. When a report method is set to "best overall grade", certain exemplary embodiments can perform verification for each light configuration listed in a light configuration portion of user interface 2000. Such embodiments can generate a summary report that renders an overall verification grade for one or more of the set of light configurations. Detailed verification results for each light configuration can be made available (e.g., by a single mouse click on a hyperlink on the summary report). When the report method is set to "first passing overall grade", certain exemplary embodiments can begin a verification sequence using each light configuration with the order in a "light configuration" portion of user interface 2000 and can stop as soon as the verification from one light has achieved a specified and/or determined minimum passing grade. The minimum passing grade can be specified, looked up from a table and/or database, and/or can be based upon a standard selected by the user.

Each of the set of light configurations can result in a different quality read of the mark. Thus, different images of the same mark can yield a different grade. In certain exemplary embodiments, a grading algorithm read the mark comprised by the image. The grading algorithm can be based on the AIM DPM-1-2006 standard (Direct Part Mark Quality Guideline) released on Dec. 12, 2006.

In certain exemplary embodiments, based on a predetermined list of known lighting configurations, an image of a part can be obtained using a subset of the set of lighting configurations. A grade for each obtained image can be automatically determined according to a grading algorithm. In certain exemplary embodiments, a "best overall grade" of a subset of grades can be determined. Each of the subset of grades can correspond to a lighting configuration of the subset of lighting configurations. One or more of the subset of grades and/or information regarding the lighting configuration associated the grades can be reported to the user. In certain exemplary embodiments, an automatic determination can be made when a lighting configuration results in an image having a grade that exceeds a predetermined minimum grade. In such embodiments, certain exemplary embodiments can avoid additional illuminations after an image associated with a suitable grade is obtained.

FIG. 3 is an exemplary embodiment of a user interface 3000, which is illustrative of an exemplary embodiment indicative of a change in an order of use of a subset of lighting configurations in illuminating an object comprising a Data Matrix mark. In the illustrated embodiment of user interface 2000, a diffuse off-axis light D is a first lighting configuration used to illuminate the object. Certain exemplary embodiments can provide a user interface adapted to allow the user to reorder lighting configurations such that the user can seek an ordering that results in obtaining an image with a passing grade more rapidly. The order of light configurations can be set and/or changed such that light configurations that are considered to be more likely produce better verification grades are listed atop the order. Certain exemplary embodiments can obtain a pass verification result quicker when the report type is set to "First Passing Overall Grade". Certain exemplary embodiments can utilize adaptive learning and/or an analysis of prior grades of categorized mark types to automatically reorder the light configurations.

Figure 4:
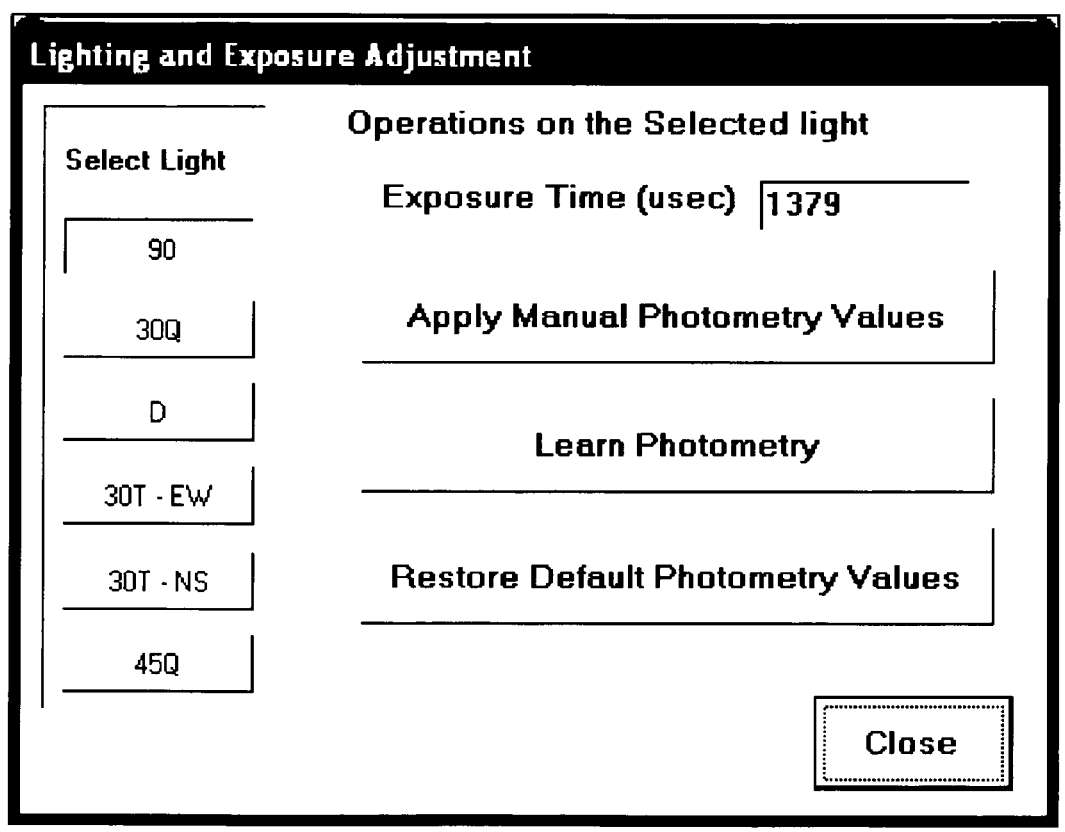
FIG. 4 is an exemplary embodiment of a user interface 4000.

FIG. 4 is an exemplary embodiment of a user interface 4000, which provides an indication of an exposure time for a selected light configuration denoted as "90". Certain exemplary embodiments can be adapted to control individual light and display image sensor's (e.g., camera's) system response parameters (e.g., exposure, gain, and offset) for one or more lighting configurations. In certain exemplary embodiments, the image sensor can be normalized to a known standard image and/or object with predetermined grayscale values. During normalization, each of the set of lighting configurations can be sequentially illuminated. During each sequential illumination, values of parameters (e.g., exposure, gain, and offset) can be adjusted in order to obtain predetermined target outputs of the image sensor for the known standard. In certain exemplary embodiments, during mark verification, the parameters corresponding to each light can be adjusted to meet a Mean Light specification of AIM DPM-1-2006. In certain exemplary embodiments, the user can inspect parameters for each light configuration and/or can make manual adjustments if desired.

Figure 5:
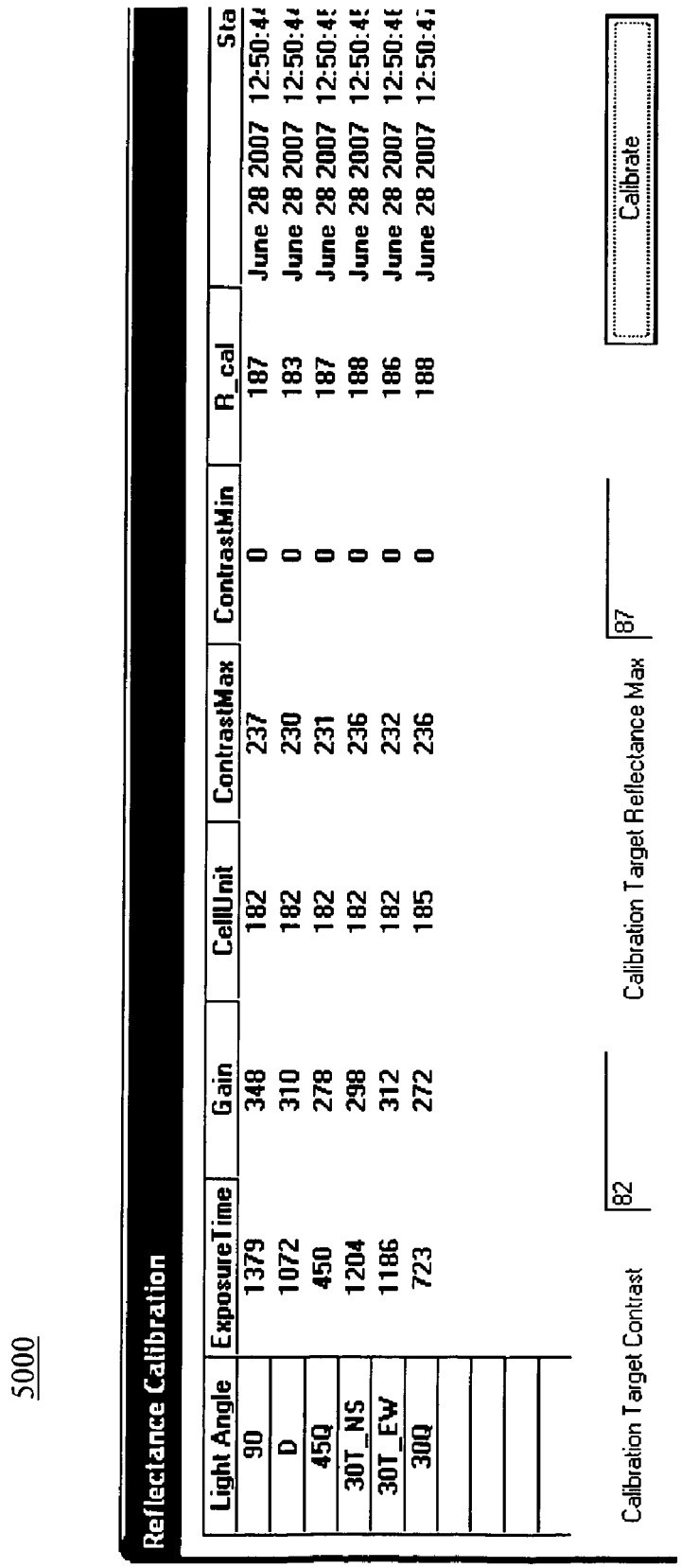
FIG. 5 is an exemplary embodiment of a user interface 5000.

FIG. 5 is an exemplary embodiment of a user interface 5000, which can render calibrated data for one or more supported light configurations. The calibration of the image sensor, from which the calibrated data is obtained, can be initiated by the user (e.g., via pressing a "Calibrate" button). In certain exemplary embodiments, a depression of a single user interface button can cause the calibration of the image sensor for each of a subset of the set of supported light configurations and/or display calibrated data to the user. For the system to report National Institute of Standards and Technology ("NIST") traceable values for optical reflectance and linear dimension, the system can be calibrated using a NIST traceable calibration test card containing a Data Matrix with known reflectance and linear dimension. The user can center the Data Matrix code of the test card in the image sensor's (e.g., camera's) field of view, enter reflectance and/or contrast values of the test card, and press the "Calibrate" button of the user interface. Certain exemplary embodiments can sequentially illuminate the subset of light configurations and perform calibration calculations for each light such that the system is calibrated for each of the subset of light configurations.

Figure 6:
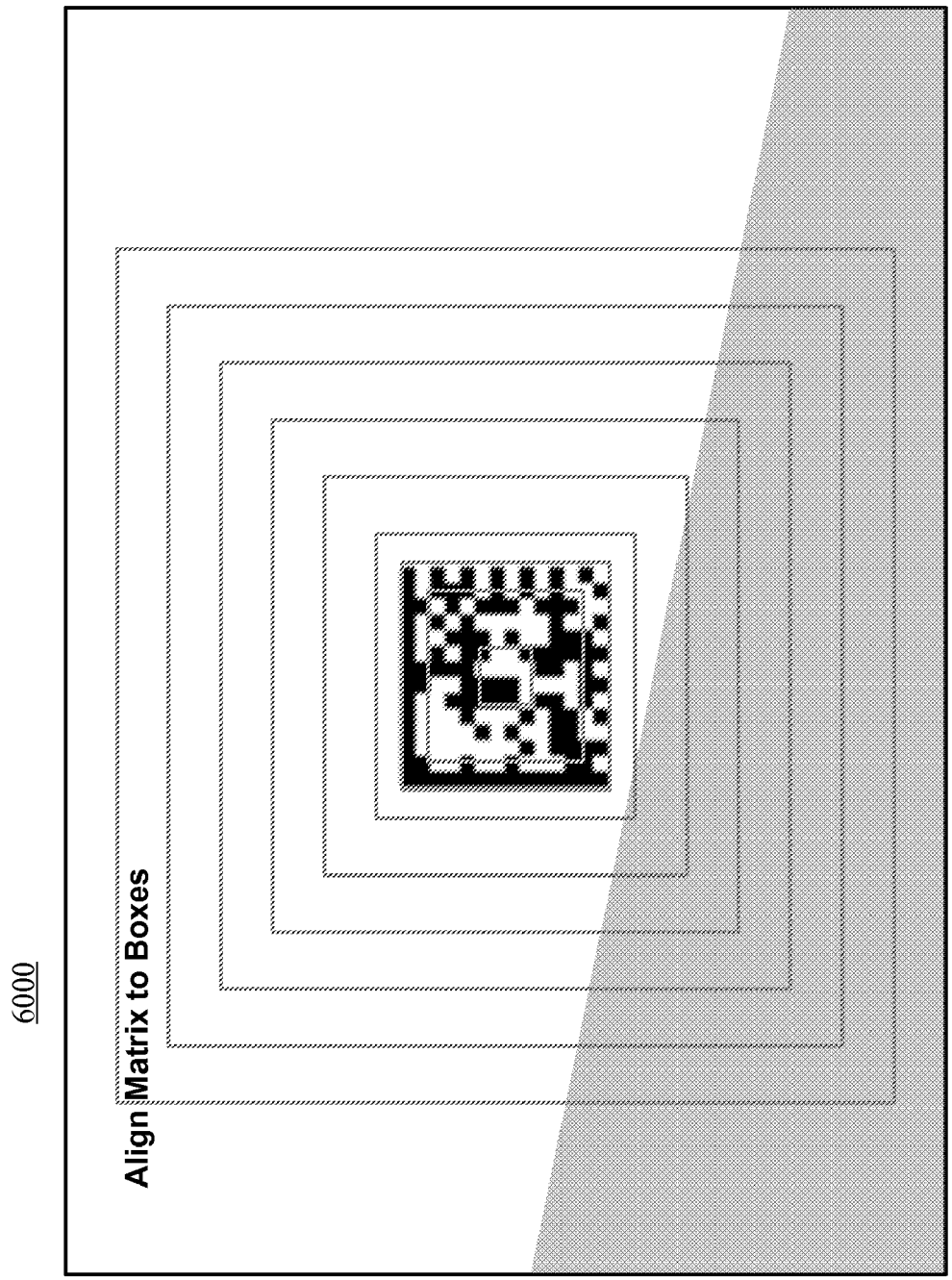
FIG. 6 is an exemplary embodiment of an image of a Data Matrix mark 6000.

FIG. 6 is an exemplary embodiment of an image of a Data Matrix mark 6000, which can illustrate via live video, and/or a graphics overlay, a center of a field of view of the imaging sensor. Live video with a graphics overlay can prompt the user to center the Data Matrix mark at a predetermined orientation. Certain exemplary embodiments can display live video with a graphic overlay of concentric squares to prompt the user to place the Data Matrix mark in the center of the field of view. The concentric squares can be spaced such that at least one solid border is parallel to one of the X and Y axes of the Data Matrix mark within approximately plus or minus five degrees. Certain exemplary embodiments can locate the Data Matrix mark via live video, and then display an outline of the Data Matrix in the center of the field of view. Certain exemplary embodiments can automatically locate the corners of the Data Matrix mark once the Data Matrix mark is moved within the field of view. Once the four corners are found, the outlines of the Data Matrix can be drawn in the center. Certain exemplary embodiments can continue to improve detection of corners of the Data Matrix mark as the Data Matrix mark is moved closer to the center the field of view of the imaging sensor. Certain exemplary embodiments can redraw outlines of the Data Matrix mark with the updated corners. Certain exemplary embodiments can disable the corner detection to improve the live video responsiveness once the four corners are located and/or decoded. Certain exemplary embodiments can monitor corner locations of the Data Matrix mark and signal to the user once the mark is in the center at a desired orientation.

Figure 7:
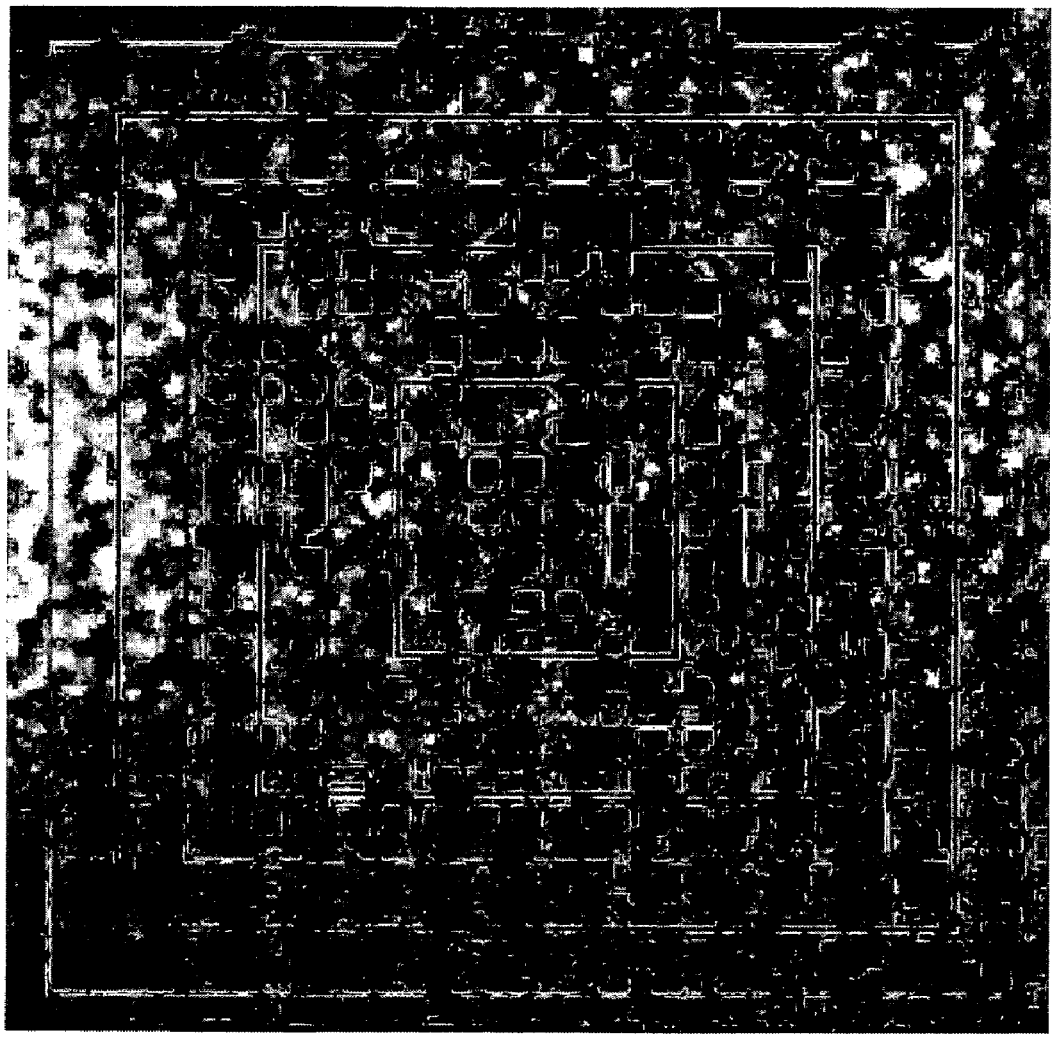
FIG. 7 is an exemplary embodiment of an image of a Data Matrix mark 7000.
Figure 8:
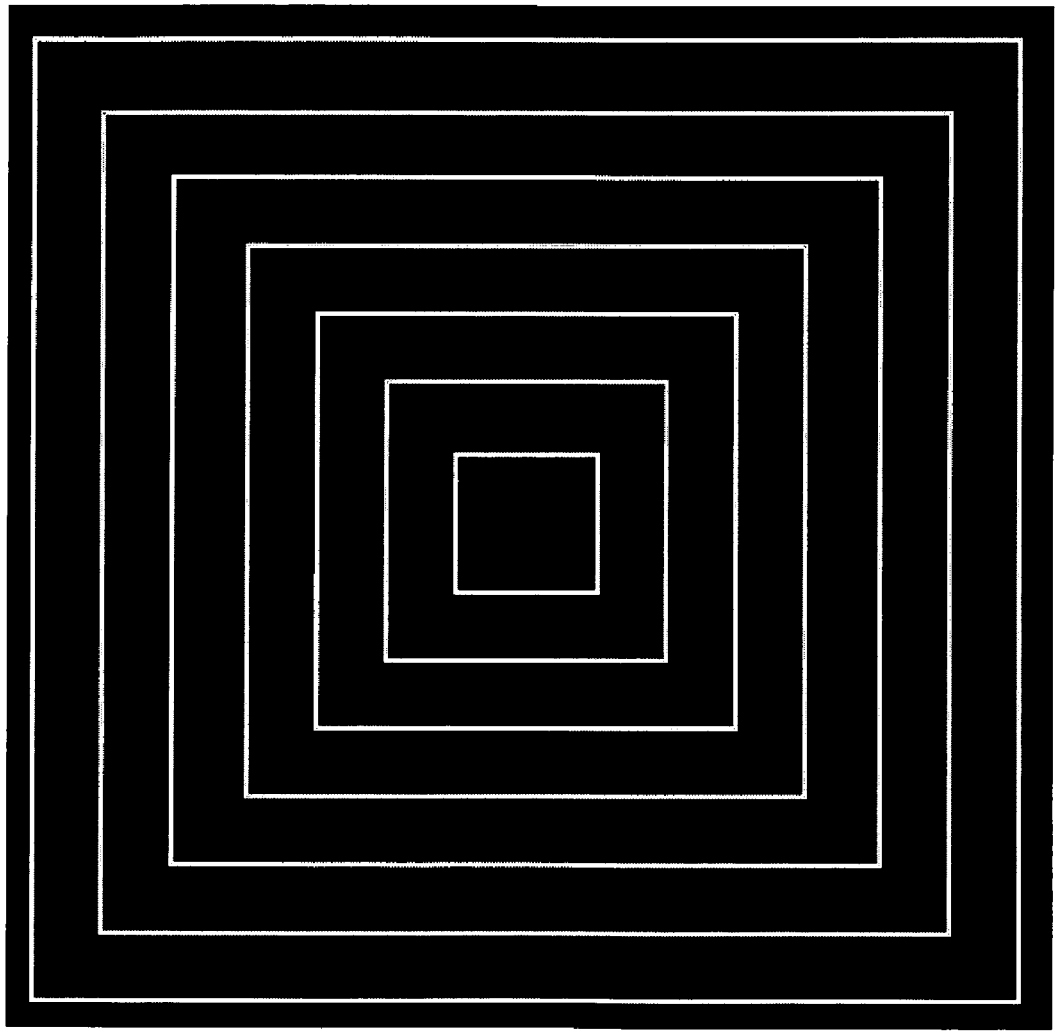
FIG. 8 is an exemplary embodiment of an image of a guide 8000 for positioning a Data Matrix mark.

FIG. 7 is an exemplary embodiment of an image of a Data Matrix mark 7000 and FIG. 8 is an exemplary embodiment of an image of a guide 8000 for positioning a Data Matrix mark. FIG. 8 is the image of the same Data Matrix mark in FIG. 7 but the mark is invisible because of the low contrast and the camera has no auto exposure control. FIG. 7 can be indicative of a live video view of a low contrast Data Matrix mark with automatic exposure adjustment enabled. FIG. 8 can be indicative of a live video view of the same low contrast Data Matrix mark with automatic exposure adjustment disabled. Live video with exposure control can be used to display the Data Matrix mark to guide the operator to center the Data Matrix mark regardless of the contrast level of the Data Matrix mark. In the live video mode, certain exemplary embodiments can perform automatic exposure control and/or adjusts image sensor response parameters (e.g., exposure, gain, offset) to maximize the contrast of the Data Matrix shown in the image.

Figure 10:
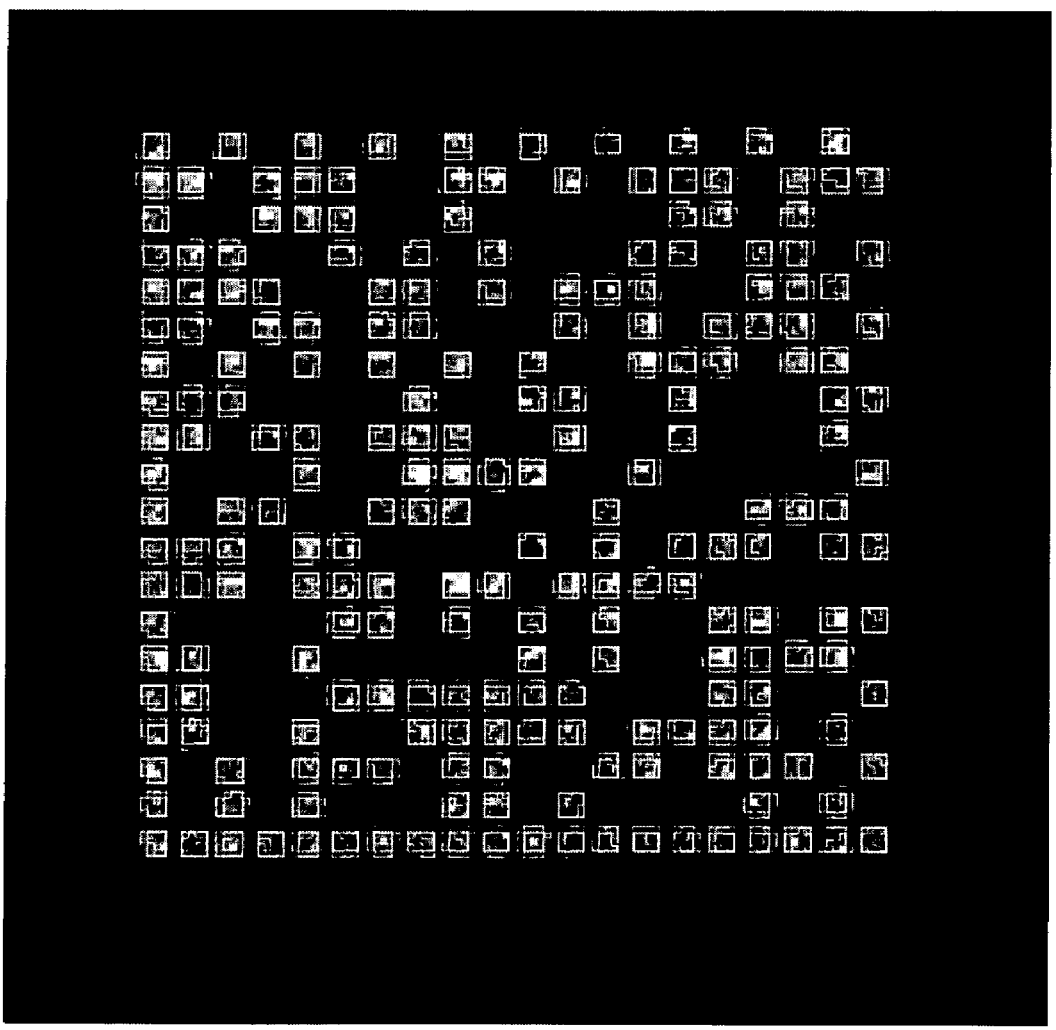
FIG. 10 is an exemplary embodiment of an image of a Data Matrix mark 10000.
Figure 11:
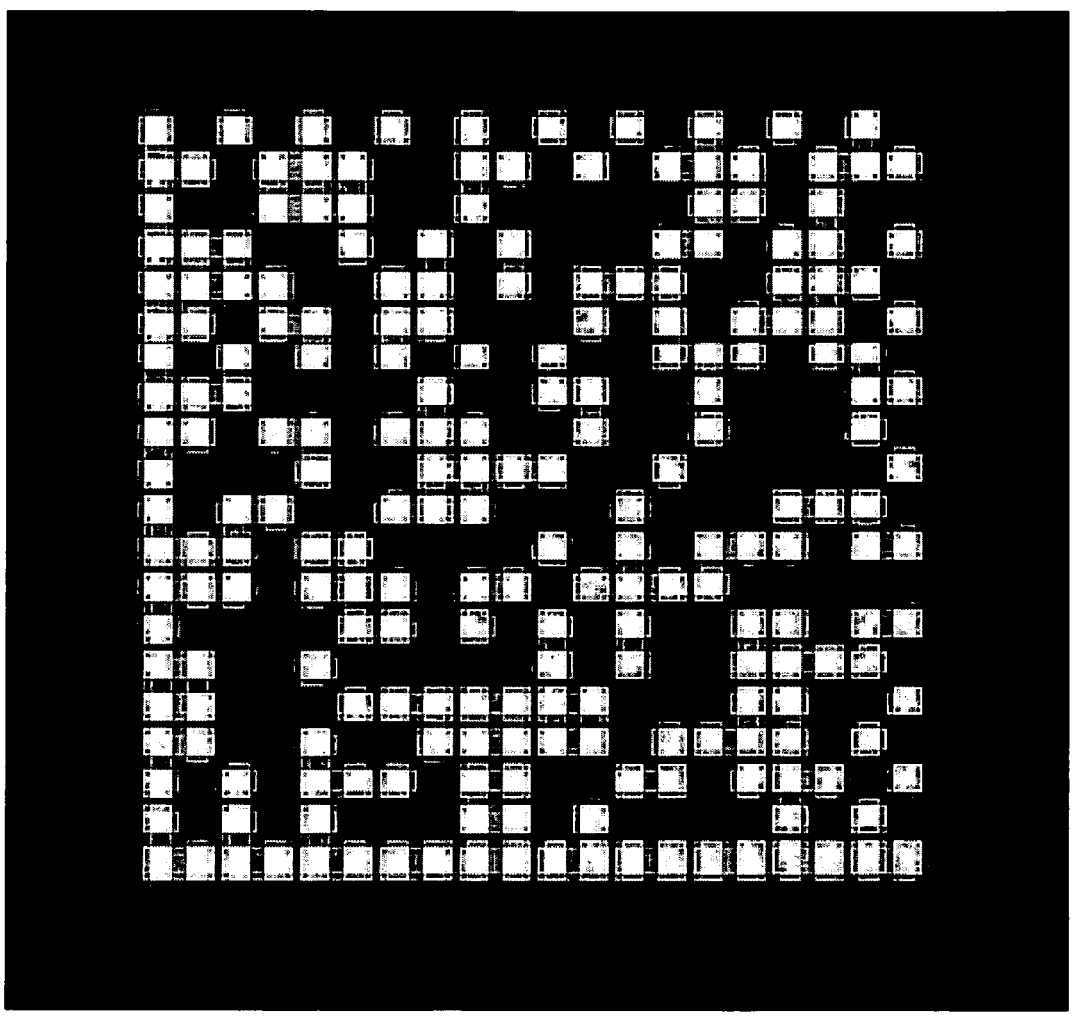
FIG. 11 is an exemplary embodiment of an image of a Data Matrix mark 11000.

FIG. 9 is an exemplary embodiment of a grading report 9000. FIG. 10 is an exemplary embodiment of an image of a Data Matrix mark 10000. FIG. 11 is an exemplary embodiment of an image of a Data Matrix mark 11000. Grading report 9000 can be a summary report of a Data Matrix mark that can be read in any of an available set of light configurations. FIG. 10 can be an image obtained via a light configuration at 90, which can provide light rays that are substantially parallel to an axis of view of the imaging sensor. FIG. 11 can be an image obtained via a light configuration at 30Q, which can provide light rays that define an angle of approximately 30 degrees relative to a plane that is substantially perpendicular to the axis of view of the camera.

Certain exemplary embodiments can categorize a Data Matrix mark by how easy or difficult the Data Matrix mark will be read with Data Matrix readers. Simple types can be read using low cost Data Matrix readers with simple lighting while the more difficult types can be read with high end Data Matrix readers with other lighting options. Certain exemplary embodiments can generate a summary report for one or more enabled light configurations and/or a report regarding a readability index that is based on the number of light configurations that are capable of producing a minimum verification grade. The readability index can be used to predict how easy the Data Matrix can be read with what type of Data Matrix readers. Each of FIG. 10 and FIG. 11 illustrates images of a Data Matrix mark that is relatively easy to read from light configurations 90 and 30Q. An exemplary embodiment provided a summary report of "A" grade from all light configurations tested for this Data Matrix Mark.

Figure 13:
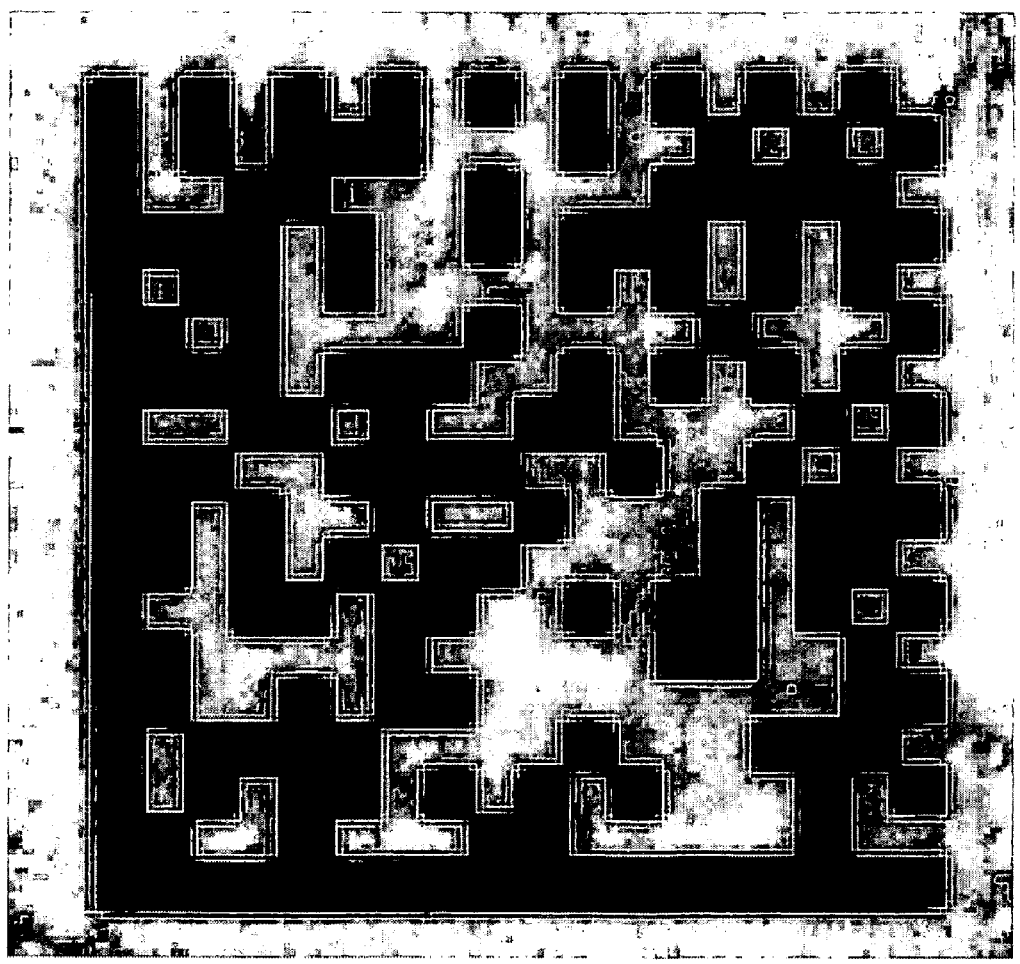
FIG. 13 is an exemplary embodiment of an image of a Data Matrix mark 13000.
Figure 14:
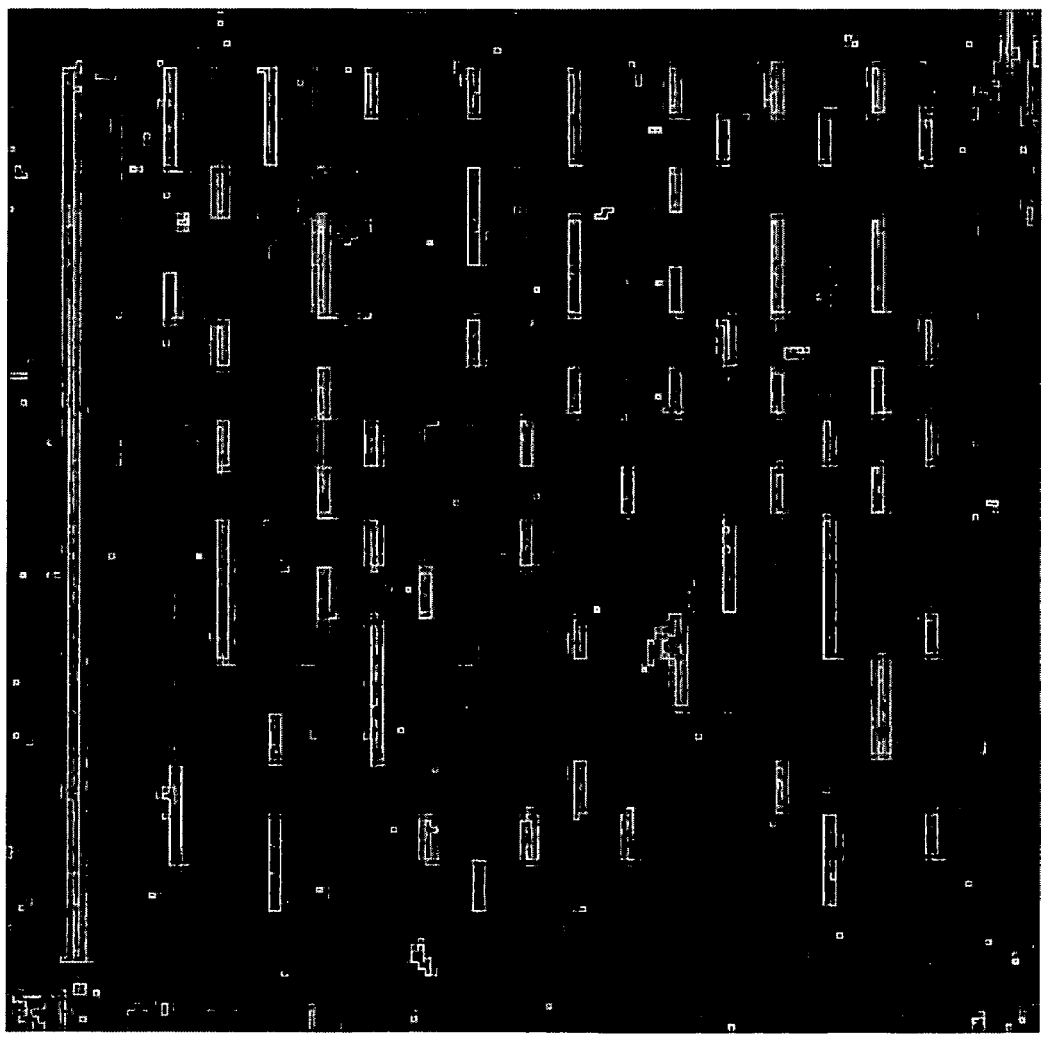
FIG. 14 is an exemplary embodiment of an image of a Data Matrix mark 14000.

FIG. 12 is an exemplary embodiment of a grading report 12000. FIG. 13 is an exemplary embodiment of an image of a Data Matrix mark 13000. FIG. 14 is an exemplary embodiment of an image of a Data Matrix mark 14000. FIG. 12 shows the summary report of another Data Matrix mark that an exemplary embodiment found readable and verifiable in two of six light configurations. FIG. 13 and FIG. 14 show images from light configurations 90 and 30Q respectively. This Data Matrix mark was more difficult for the exemplary system to verify from light configuration 30Q, which resulted in summary report grade of F grade from the light configuration 30Q. This mark receives a summary report of "F" grade from light configurations 30Q, 45Q, 30T_EW, and 30T_NS and is categorized as a difficult to read mark that can be read via a relatively high end Data Matrix reader, which can be more able to read relatively difficult marks.

Figure 15:
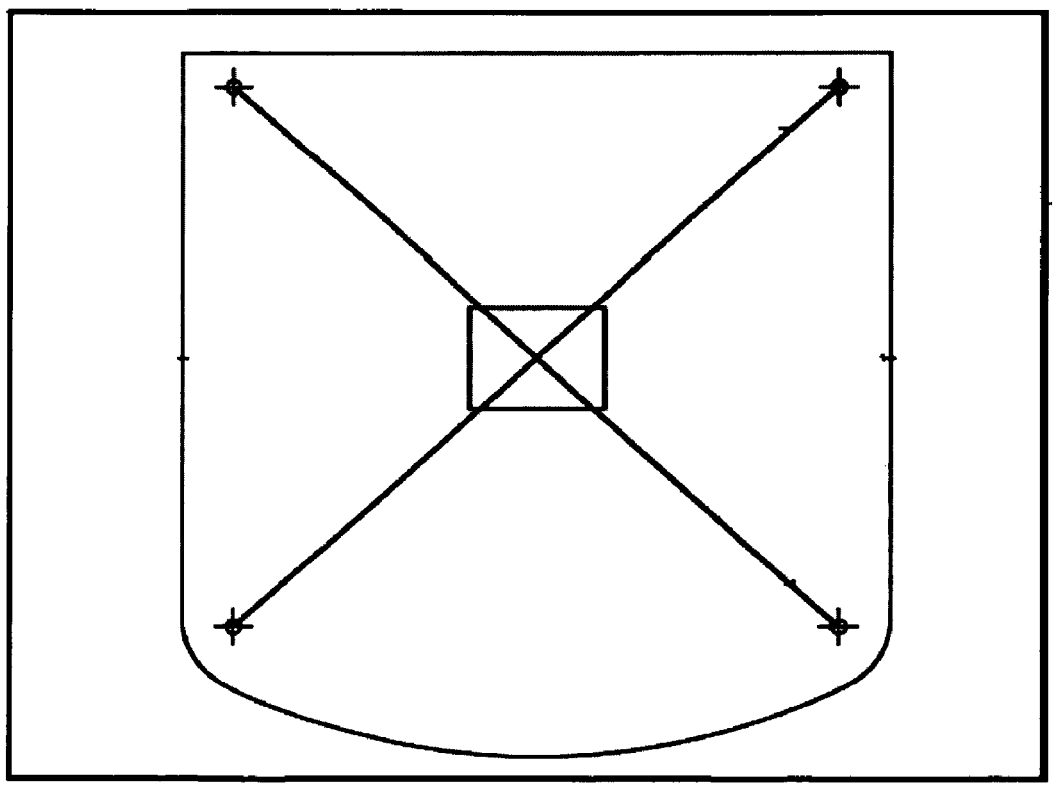
FIG. 15 is a schematic representation of an exemplary embodiment of a target fixture 15000.
Figure 16:
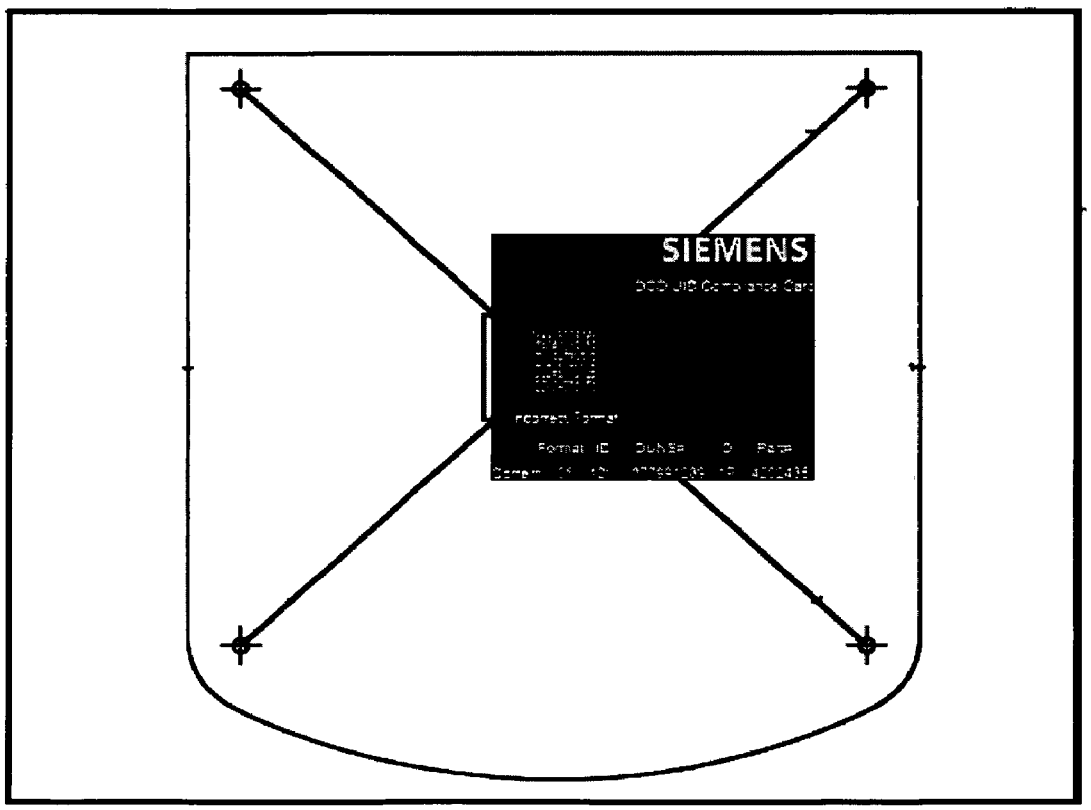
FIG. 16 is a schematic representation of an exemplary embodiment of a target fixture 16000.

FIG. 15 is a schematic representation of an exemplary embodiment of a target fixture 15000. FIG. 16 is a schematic representation of an exemplary embodiment of a target fixture 16000. FIG. 15 shows a target fixture with a field of view indicator. FIG. 16 illustrates a Data Matrix mark placed near a center of the field of view indicator. The target fixture can be used for initial part placement and/or precise positioning adjustment. The target fixture can prompt the user to place the Data Matrix mark within the camera's field of view. Certain exemplary embodiments can comprise one or more of:

- an outline on the target, which can be the same size and shape of the camera's bottom housing to prompt the user to position the fixture under the camera to the same rough position each time;
- a rectangular set of markings approximately in the middle of the fixture that represent the camera's field of view when the target fixture is placed under the camera housing (such markings can aid in the placement of a small Data Matrix within the field of view when the fixture target with the part placed on top of it is positioned under the camera housing);
- for a larger data plate printed with a Data Matrix mark that obscures the field of view rectangular markings, two long diagonal lines can provided that cross the Placement Target Fixture at the center of the field of view (such lines can provide a visual reference to where the center of the field of view is as the user's vision fills in the obscured diagonal lines across the data plate by continuing the diagonal lines seen at the corners of the fixture across the obscuring data plate); and
- a control via which user can move the fixture to further center the Data Matrix mark using live video without having to move the mark itself.

Figure 17:
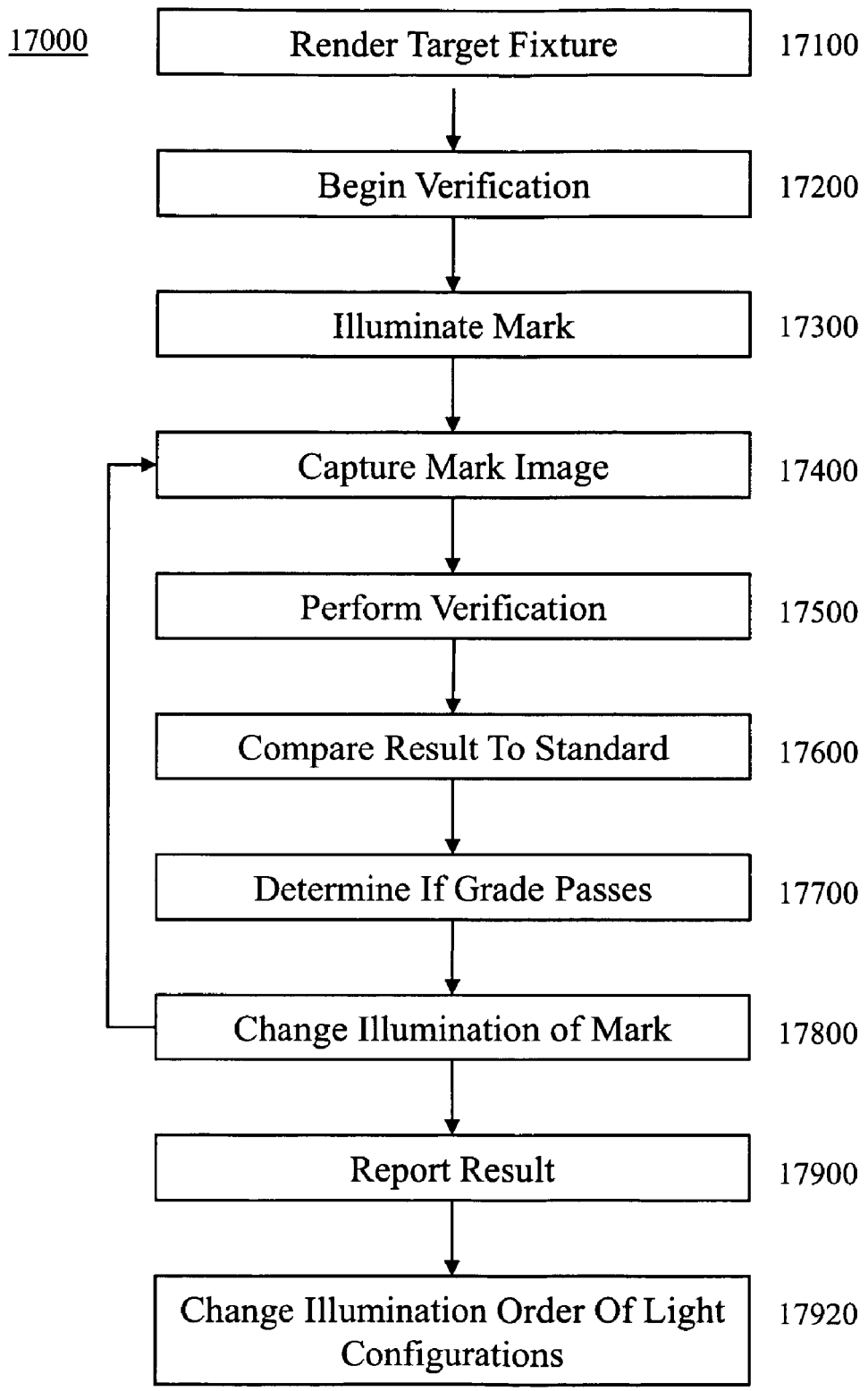
FIG. 17 is a flowchart of an exemplary embodiment of a method 17000.

FIG. 17 is a flowchart of an exemplary embodiment of a method 17000. One or more activities of method 17000 can be performed automatically, such as via machine-implementable instructions executed by an information device. The machine-implementable instructions can be stored on a machine readable medium associated with the information device. Certain exemplary illumination systems associated with method 17000 can comprise a camera and a set of light sources. Subsets of the set of light sources can be adapted to form a plurality of predetermined light configurations. A predetermined set of the plurality of light configurations can be used to illuminate the Data Matrix mark. The predetermined set can be manually or automatically selected based upon a user selected mark type. The camera can be adapted to obtain an image and/or image information regarding a Data Matrix mark. The plurality of predetermined light configurations can utilize the set of light sources. The set of light sources can comprise:

- a first subset of light sources adapted to illuminate the Data Matrix mark via light rays that are substantially parallel to an axis of view of a camera;
- a second subset of light sources adapted to illuminate the Data Matrix mark via light rays that define an angle of approximately 30 degrees relative to a plane that is substantially perpendicular to the axis of view of the camera; and
- a third subset of light sources adapted to illuminate the Data Matrix mark via light rays that define an angle of approximately 45 degrees relative to the plane.

Certain exemplary embodiments can normalize to a predetermined standard mark read via the camera for each of the plurality of predetermined light configurations. The verification test can be performed on a read of an image obtained via a selected light configuration of the plurality of predetermined light configurations. The plurality of light configurations can be used to sequentially illuminate the Data Matrix mark in a determined order. The verification test can be adapted to determine that the read of the Data Matrix mark has resulted in a minimum passing grade of a user-selected industry standard. In certain exemplary embodiments, the industry standard can be the Association for Automatic Identification and Mobility DPM-1-206 standard. Certain exemplary embodiments can be adapted to obtain image information of the predetermined standard and/or make adjustments to one or more of exposure, gain, and offset based upon the known standard. Certain exemplary embodiments can cause readability index report to be rendered. The readability index report can comprise a readability index adapted to predict a level of difficulty associated with reading the Data Matrix mark.

At activity 17100, a target fixture can be rendered and/or provided. The target fixture can comprise an outline adapted to direct a user in placement of a bottom housing of the camera. The target fixture can comprise marks indicative of an extent of a field of view of the camera. The target fixture can comprise marks indicative of a center of the field of view of the camera. Certain exemplary embodiments can be adapted to assist a user in placement of an object comprising the Data Matrix mark. For placement of the Data Matrix mark, certain exemplary embodiments can cause a video to be rendered. The video can be adapted to provide information to the user regarding placement of the object in the field of view of the camera.

At activity 17200, a verification sequence can be begun, such as via a user pressing a button. The verification sequence can comprise a set and/or subset of activities 17300 through 17800.

At activity 17300, the mark can be illuminated such as via a first predetermined light configuration. The predetermined light configuration can be selected from a plurality of predetermined light configurations. The light configuration selected for the read can be proved by the user. In certain exemplary embodiments, the selected light configuration can be determined automatically. The selected light configuration can utilize a subset of the set of light sources. The selected light configuration can cause an automatic illumination of an object comprising the Data Matrix mark. Certain exemplary embodiments can cause a duration of illumination of a light source used in the selected light configuration to be controlled. Certain exemplary embodiments can cause a sequential illumination of light sources in the selected light configuration. The sequential illumination can comprise at least one substantially non-simultaneous illumination of a first light source and a second light source.

At activity 17400, an image of the Data Matrix mark can be captured and/or information comprised by the mark can be obtained and/or interpreted. Certain exemplary embodiments can be adapted to derive and/or attempt to derive characters represented by the Data Matrix mark from image information obtained by a camera. An accuracy of deriving the characters can be related to the type of mark and the light configuration illuminating the Data Matrix mark.

At activity 17500, a verification of the Data Matrix mark can be performed. The verification test can involve a comparison of the read to the predetermined standard. Certain exemplary embodiments can analyze an image of the Data Matrix mark and/or measure the quality of a cell geometry and contrast. If the verification quality of the mark is good, then a probability of being able to read the Data Matrix mark can be relatively high.

At activity 17600, a result can be compared to a standard. The result can be obtained based upon an image of the Data Matrix mark from the verification of the Data Matrix Mark. The result can be based upon a derivation of character information from the Data Matrix mark by an information device.

At activity 17700, a determination can be made if a grade of the read of the Data Matrix mark passes a predetermined minimum passing grade. In certain exemplary embodiments, the grade can be a letter grade of A through F. In such embodiments, the passing grade can be set to one of A, B, C, D, or E. Certain exemplary embodiments can be adapted to pass control of method 17000 to activity 17900 if a grade of the Data Matrix mark passes a predetermined minimum passing grade. Certain exemplary embodiments can be adapted to continue at activity 17800 if an image for each illumination of the plurality of lighting configurations is sought and/or if all of the plurality of light configurations has not been used to illuminate the Data Matrix mark. Certain exemplary embodiments can be adapted to transfer control to activity 17900 if a passing grade is achieved and an image for each illumination of the plurality of lighting configurations is not sought and/or a passing grade is not obtained after illuminating each of the plurality of lighting configurations.

In certain exemplary embodiments, even if a passing grade is obtained, a set of grade results can be determined. Each of the set of grade results can correspond to a light configuration of the plurality of light configurations. In certain exemplary embodiments, each of the plurality of light configurations can be used to sequentially illuminate the Data Matrix mark and a result for each image obtained thereby can be graded. Each of the set of grades can be determined for a corresponding light configuration of the plurality of light configurations. Certain exemplary embodiments can be adapted to cause a set of images of the Data Matrix mark, upon which the set of grade results is based, to be automatically rendered. Each of the set of images can correspond to an illumination provided by one of the plurality of predetermined light configurations. The result can be determined to be a best result of a plurality of results obtained in attempting to perform quality verification of the Data Matrix mark.

At activity 17800, the illumination of the Data Matrix mark can be adjusted and/or changed. For example, a next selected light configurations of the plurality of light configurations can be chosen according to a predetermined ordering of the plurality of light configurations. The predetermined ordering can be set by the user and/or can be set and/or automatically configured based upon calibration results, verification results, and/or prior grades of previously read Data matrix marks. In certain exemplary embodiments, each of the plurality of light configurations can be used to sequentially illuminate the Data Matrix mark only until a light configuration has resulted in a minimum passing grade. If the illumination is changed, control can be transferred to activity 17400. If the illumination is not changed, control can be transferred to activity 17900.

At activity 17900, a result can be reported. Certain exemplary embodiments can be adapted to cause a report to be automatically generated. The report can be indicative of a result of the read of the Data Matrix mark. The result can be the grade result and/or an automatic determination that a read of a Data Matrix mark has passed a verification test. The result can be the set of grades for each image obtained via illumination of a corresponding light configuration of the plurality of light configurations. In certain exemplary embodiments, a failure can be reported if no lighting configuration of the plurality of lighting configurations results in a passing grade.

At activity 17920, an order of illumination sources can be changed. In certain exemplary embodiments, the order of the illumination sources can be user changeable. In certain exemplary embodiments, the determined order can be automatically adjusted based upon one or more previous verification tests. In such embodiments, the order of illumination sources can be dynamically adjusted.

Figure 18:
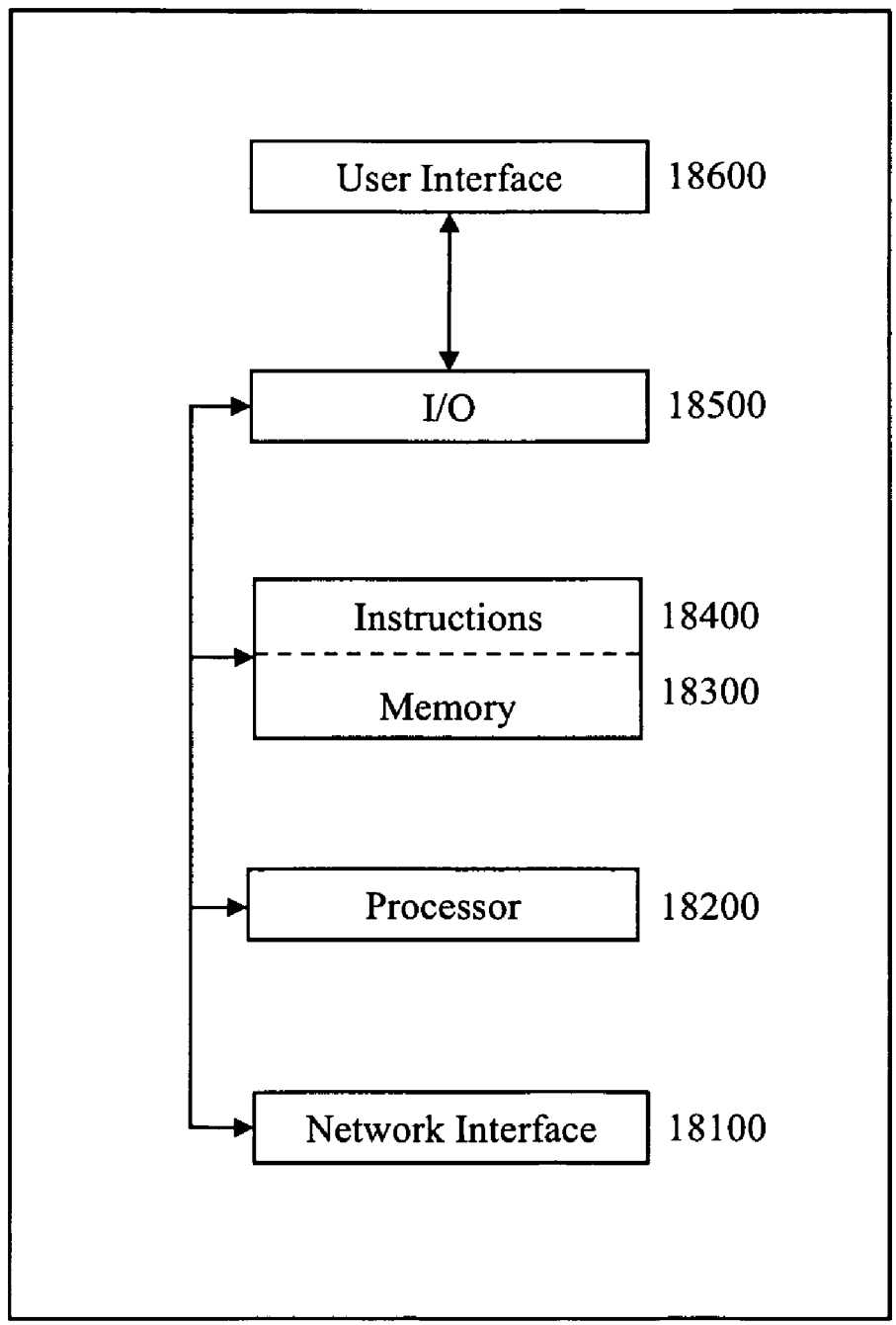
FIG. 18 is a block diagram of an exemplary embodiment of an information device 18000.

FIG. 18 is a block diagram of an exemplary embodiment of an information device 18000, which in certain operative embodiments can comprise, for example, information device 1100 and server 1700, of FIG. 1. Information device 18000 can comprise any of numerous circuits and/or components, such as for example, one or more network interfaces 18100, one or more processors 18200, one or more memories 18300 containing instructions 18400, one or more input/output (I/O)

devices 18500, and/or one or more user interfaces 18600 coupled to I/O device 18500, etc.

In certain exemplary embodiments, via one or more user interfaces 18600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

- activity—an action, act, deed, function, step, and/or process and/or a portion thereof
- adapted to—suitable, fit, and/or capable of performing a specified function.
- adjust—to change and/or bring into a predetermined relationship.
- allow—to provide, let do, happen, and/or permit.
- and/or—either in conjunction with or in alternative to.
- angle—a measure of rotation between a ray and a reference ray and/or plane.
- apparatus—an appliance and/or device for a particular purpose.
- approximately—about and/or nearly the same as.
- associate—to join, connect together, and/or relate.
- associated with—related to.
- Association for Automatic Identification and Mobility DPM-1-206 standard—a specific published industry standard regarding marks.
- at least—not less than.
- attempt—to try to achieve.
- automatic—performed via an information device in a manner essentially independent of influence and/or control by a user.
- automatically—acting and/or operating in a manner essentially independent of external human influence and/or control. For example, an automatic light switch can turn on upon "seeing" a person in its view, without the person manually operating the light switch.
- axis—a straight line about which a body and/or geometric object rotates and/or can be conceived to rotate and/or a center line to which parts of a structure and/or body can be referred.
- based upon—determined in consideration of and/or derived from.
- best result—an outcome that is objectively better than all other possible outcomes.
- bottom housing—a lower portion of a casing when an operatively mounted camera in the casing has an axis of view that is directed substantially vertically.
- calibrate—to check and/or adjust an imaging device, for each lighting configuration of a set of lighting configurations, to provide a reading that matches a grayscale value of a standard.
- calibration—a checking of an instrument against a reference point and/or standard.
- camera—a device and/or system adapted to capture and/or record an image.
- can—is capable of, in at least some embodiments.
- cause—to bring about, provoke, precipitate, produce, elicit, be the reason for, result in, and/or effect.
- center—a point that is substantially equally distant from the outer boundaries of something.
- change—(v.) to cause to be different; (n.) the act, process, and/or result of altering and/or modifying.
- changeable—capable of being changed.
- comprise—to include but not be limited to.
- configuration—a physical, logical, and/or logistical arrangement of elements.
- configure—to make suitable and/or fit for a specific use and/or situation.
- control—(n) a mechanical and/or electronic device used to operate a machine within predetermined limits; (v) to exercise authoritative and/or dominating influence over, cause to act in a predetermined manner, direct, adjust to a requirement, and/or regulate.
- convert—to transform, adapt, and/or change.
- corresponding—related, associated, accompanying, similar in purpose and/or position, conforming in every respect, and/or equivalent and/or agreeing in amount, quantity, magnitude, quality, and/or degree.
- create—to bring into being.
- data—distinct pieces of information, usually formatted in a special and/or predetermined way and/or organized to express concepts.
- Data Matrix mark—a coded symbol that is interpretable to represent a defined set of characters.
- define—to establish the meaning, relationship, outline, form, and/or structure of; and/or to precisely and/or distinctly describe and/or specify.
- degree—a unit of measure of a plane angle representing $1/360$ of a full rotation.
- determine—to obtain, calculate, decide, deduce, establish, and/or ascertain.
- device—a machine, manufacture, and/or collection thereof.
- direct—to provide instruction to.
- duration—a measure of a period over which something occurs and/or exists.
- each—every one of a group considered individually.
- execute—to carry out a computer program and/or one and/or more instructions.
- extent—a breadth of.
- field of view—a range of space over which a camera can obtain an image.
- first—an initial cited element of a set.
- from—used to indicate a source.
- further—in addition.
- generate—to create, produce, render, give rise to, and/or bring into existence.
- grade—a defined assessment.
- haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

illuminate—to direct light energy toward.

image—an at least two-dimensional representation of an entity and/or phenomenon.

indicative—serving to indicate.

industry standard—something, such as a practice, system, product, and/or tool, that is widely recognized and/or employed within a specific branch of manufacture and/or trade.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC and/or other integrated circuit, a hardware electronic logic circuit such as a discrete element circuit, and/or a programmable logic device such as a PLD, PLA, FPGA, and/or PAL, and/or the like, etc. In general any device on which resides a finite state machine capable of implementing at least a portion of a method, structure, and/or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

input—a signal, data, and/or information provided to a processor, device, and/or system.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached and/or connected.

intensity—a measure of time-averaged energy flux.

level of difficulty—a measure and/or estimate of an expected amount of effort to achieve an objective.

light—electromagnetic radiation of any wavelength.

linear dimension—a determined distance associated with an illumination system.

machine readable medium—a physical structure from which a machine, such as an information device, computer, microprocessor, and/or controller, etc., can obtain and/or store data, information, and/or instructions. Examples include memories, punch cards, and/or optically-readable forms, etc.

machine vision—a technology application that uses hardware, firmware, and/or software to automatically obtain image information, the image information adapted for use in performing a manufacturing activity.

machine-implementable instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

mark—a discernible symbol.

may—is allowed and/or permitted to, in at least some embodiments.

memory device—an apparatus capable of storing analog and/or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

minimum passing grade—a lowest acceptable level.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, and/or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, and/or other similar device.

non—not.

normalize—for each lighting configuration of a set of lighting configurations, to compare obtained values to a standard and/or norm and adjust an exposure, gain, and/or offset of an imaging device responsive to the comparison.

object—a physical thing; an item associated with a radio frequency identification tag; a grouping of data and/or executable instructions; and/or a discrete graphical item that can be selected and maneuvered, such as an onscreen graphic.

obtain—to receive, get, take possession of, procure, acquire, calculate, determine, and/or compute.

one—a single unit.

only—substantially without anything else.

order—a sequence.

outline—a scaled representation of a portion of an object.

parallel—of, relating to, and/or designating lines, curves, planes, and/or surfaces everywhere equidistant and/or an arrangement of components in an electrical circuit that splits an electrical current into two or more paths.

pass—to exceed a minimum standard.

perform—to begin, take action, do, fulfill, accomplish, carry out, and/or complete, such as in accordance with one or more criterion.

perpendicular—intersecting at and/or forming substantially right angles.

placement—a location at which something is positioned.

plane—a surface containing all the straight lines that connect any two points on it.

plurality—the state of being plural and/or more than one.

predetermined—established in advance.

predict—to prognosticate a future event.

previous—prior to.

process—(n.) an organized series of actions, changes, and/or functions adapted to bring about a result. (v.) to perform mathematical and/or logical operations according to programmed instructions in order to obtain desired information and/or to perform actions, changes, and/or functions adapted to bring about a result.

processor—a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) and/or a Field Programmable Gate Array (FPGA) that has been designed to implement in its hardware and/or firmware at least a part of an embodiment disclosed herein. A processor can reside on and use the capabilities of a controller.

provide—to furnish, supply, give, convey, send, and/or make available.

quality verification—a test to determine whether an object and/or a characteristic of an object meets a predetermined criterion.

ray—a column of light.

read—to discern and/or interpret a meaning of a mark.

readability index—a value indicative of a degree of difficulty expected in reading a mark and/or coded message.

receive—to get as a signal, take, acquire, and/or obtain.

reflectance—return of radiant energy by a surface.

regarding—pertaining to.

relative—considered with reference to and/or in comparison to something else.

render—to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc.

repeatedly—again and again; repetitively.

report—(n.) a presentation of information in a predetermined format; (v.) to present information in a predetermined format.

responsive—reacting to an influence and/or impetus.

result—an outcome and/or consequence of a particular action, operation, and/or course.

said—when used in a system and/or device claim, an article indicating a subsequent claim term that has been previously introduced.

second—a cited element of a set that follows an initial element.

select—to make a choice and/or selection from alternatives.

selectable—capable of being chosen and/or selected.

selection—a choice.

sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, and/or electro-magnetic radiation, etc.) and convert that physical quantity into a signal. Examples include proximity switches, stain gages, photo sensors, thermocouples, level indicating devices, speed sensors, accelerometers, electrical voltage indicators, electrical current indicators, on/off indicators, and/or flowmeters, etc.

sequentially—in an ordered consecutive manner.

set—a related plurality of predetermined elements; and/or one or more distinct items and/or entities having a specific common property or properties.

simultaneous—at substantially the same time.

single—existing alone and/or consisting of one entity.

source—an original transmitter.

standard—one or more settled criterion.

store—to place, hold, and/or retain data, typically in a memory.

subset—a portion of a set.

substantially—to a considerable, large, and/or great, but not necessarily whole and/or entire, extent and/or degree.

system—a collection of mechanisms, devices, machines, articles of manufacture, processes, data, and/or instructions, the collection designed to perform one or more specific functions.

target fixture—a template associated with an imaging device and/or system.

third—a cited element of a set that follows a second element.

transmit—to send as a signal, provide, furnish, and/or supply.

type—a number of things having in common traits and/or characteristics that distinguish them as a group and/or class.

United States Department of Defense MIL-STD-130 standard—a specific published United States military standard regarding marks.

until—up to a time when.

used—implemented.

user—a person, organization, process, device, program, protocol, and/or system that uses a device, system, process, and/or service.

user input—human-provided information.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element and/or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

user-selected—stated, provided, and/or determined by a user.

utilize—to use and/or put into service.

value—a measured, assigned, determined, and/or calculated quantity and/or quality for a variable and/or parameter.

verification test—a test designed to determine whether the tested item has a predetermined capability and/or whether the tested item complies with a predetermined requirement.

via—by way of and/or utilizing.

video—humanly visible and varying images.

view—to see, examine, and/or capture an image of.

weight—a value indicative of importance.

when—at a time.

wherein—in regard to which; and; and/or in addition to.

zero—at a point of origin of a coordinate system.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, and/or argument, with respect to any claim, whether of this application and/or any claim of any application claiming priority hereto, and whether originally presented or otherwise:

there is no requirement for the inclusion of any particular described and/or illustrated characteristic, function, activity, and/or element, any particular sequence of activities, and/or any particular interrelationship of elements;

any elements can be integrated, segregated, and/or duplicated;

any activity can be repeated, any activity can be performed by multiple entities, and/or any activity can be performed in multiple jurisdictions; and any activity and/or element can be specifically excluded, the sequence of activities can vary, and/or the interrelationship of elements can vary.

Moreover, when any number and/or range is described herein, unless clearly stated otherwise, that number and/or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein and/or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A method comprising:
causing a report to be automatically generated, said report indicative of a result of a read of a Data Matrix mark, said result automatically determined to pass a verification test, said verification test performed on an image obtained via a selected light configuration of a plurality of predetermined light configurations, said plurality of light configurations used to sequentially illuminate said Data Matrix mark in a determined order, said verification test adapted to determine that said read of said Data Matrix mark has resulted in a minimum passing grade of a user-selected industry standard, said plurality of predetermined light configurations utilizing a set of light sources, said set of light sources comprising a first light source adapted to illuminate said Data Matrix mark via light rays that are substantially parallel to an axis of view of a camera, a second light source adapted to illuminate said Data Matrix mark via light rays that define an angle of approximately 30 degrees relative to a plane that is substantially perpendicular to said axis of view of said camera, and a third light source adapted to illuminate said Data Matrix mark via light rays that define an angle of approximately 45 degrees relative to said plane, said camera adapted to obtain said image.

2. The method of claim 1, wherein:
a predetermined set of said plurality of light configurations is used to illuminate said Data Matrix mark, said predetermined set automatically selected based upon a user selected mark type.

3. The method of claim 1, wherein:
each of said plurality of light configurations is used to sequentially illuminate said Data Matrix mark only until a light configuration has resulted in said minimum passing grade.

4. The method of claim 1, wherein:
each of said plurality of light configurations is used to sequentially illuminate said Data Matrix mark, said result having a best determined grade of a set of grades, each of said set of grades determined for a corresponding light configuration of said plurality of light configurations.

5. The method of claim 1, wherein:
said determined order is user changeable.

6. The method of claim 1, wherein:
said determined order is automatically adjusted based upon a previous verification test.

7. The method of claim 1, wherein:
said selected light configuration is provided by a user.

8. The method of claim 1, wherein:
said selected light configuration is determined automatically.

9. The method of claim 1, further comprising:
causing an automatic illumination of an object comprising said Data Matrix mark.

10. The method of claim 1, further comprising:
causing an automatic selection of said selected light configuration, said selected light configuration utilizing a subset of said set of light sources.

11. The method of claim 1, further comprising:
causing an illumination of said Data Matrix mark to be automatically changed.

12. The method of claim 1, further comprising:
causing a set of images of said Data Matrix mark to be automatically rendered, each of said set of images corresponding to an illumination provided by one of said plurality of predetermined light configurations, said set of images comprising said image.

13. The method of claim 1, further comprising:
receiving said predetermined order of said plurality of predetermined light configurations from a user.

14. The method of claim 1, further comprising:
based upon a previous set of verification tests, automatically changing an order of said plurality of predetermined light configurations used to illuminate said Data Matrix mark.

15. The method of claim 1, further comprising:
normalizing said camera for each of said plurality of predetermined light configurations.

16. The method of claim 1, further comprising:
causing a duration of illumination of a light source used in said selected light configuration to be controlled.

17. The method of claim 1, further comprising:
calibrating said camera for each of said plurality of predetermined light configurations.

18. The method of claim 1, further comprising:
causing a sequential illumination of light sources in said selected light configuration, said sequential illumination comprising at least one substantially non-simultaneous illumination of a first light source and a second light source.

19. The method of claim 1, further comprising:
causing a video to be rendered, said video adapted to provide information to a user regarding placement of an object comprising said Data Matrix mark in a field of view of a camera, said camera adapted to obtain said image.

20. The method of claim 1, further comprising:
causing readability index report to be rendered, said readability index report comprising a readability index adapted to predict a level of difficulty associated with reading said Data Matrix mark.

21. The method of claim 1, further comprising:
providing a target fixture, said target fixture comprising an outline adapted to direct a user in placement of a bottom housing of a camera, said camera adapted to obtain said image, said target fixture comprising marks indicative of an extent of a field of view of said camera, said target fixture comprising marks indicative of a center of said field of view of said camera.

22. The method of claim 1, wherein:
said result is determined to be a best result of a plurality of results obtained in attempting to perform quality verification of said Data Matrix mark.

23. A machine-readable medium comprising machine-implementable instructions for activities comprising:
causing a report to be automatically generated, said report indicative of a result of a read of a Data Matrix mark, said result automatically determined to pass a verification test, said verification test performed on an image obtained via an automatically selected light configuration of a plurality of predetermined light configurations, said plurality of light configurations used to illuminate said Data Matrix mark sequentially in a user changeable predetermined order, said verification test adapted to determine that said read of said Data Matrix mark has resulted in a minimum passing grade of a user-selected Association for Automatic Identification and Mobility DPM-1-206 standard, said standard one of a plurality of predetermined user-selectable standards.

24. A system, comprising:
a Data Matrix mark processor adapted to read a Data Matrix mark, said read automatically determined to pass a verification test, said verification test performed on an image obtained via an automatically selected light configuration of a plurality of predetermined light configurations, said plurality of light configurations used to sequentially illuminate said Data Matrix mark in a user changeable predetermined order, said verification test adapted to determine that said read of said Data Matrix mark has resulted in a minimum passing grade of a user-selected industry standard.

* * * * *